US012363814B1

(12) United States Patent
Tseng

(10) Patent No.: US 12,363,814 B1
(45) Date of Patent: Jul. 15, 2025

(54) LUMINOUS DEVICE AND WEARABLE OBJECT WITH THE SAME

(71) Applicant: Shen-Ko Tseng, Taipei (TW)

(72) Inventor: Shen-Ko Tseng, Taipei (TW)

(*) Notice: Subject to any disclaimer, the term of this patent is extended or adjusted under 35 U.S.C. 154(b) by 0 days.

(21) Appl. No.: 18/819,698

(22) Filed: Aug. 29, 2024

Related U.S. Application Data

(60) Provisional application No. 63/637,991, filed on Apr. 24, 2024.

(30) Foreign Application Priority Data

May 31, 2024 (TW) ................................ 113120342

(51) Int. Cl.

| | |
|---|---|
| ***H05B 47/17*** | (2020.01) |
| ***F21L 4/02*** | (2006.01) |
| ***F21V 19/00*** | (2006.01) |
| ***F21V 21/08*** | (2006.01) |
| ***F21V 23/00*** | (2015.01) |

(Continued)

(52) U.S. Cl.
CPC ................ *H05B 47/17* (2020.01); *F21L 4/02* (2013.01); *F21V 19/001* (2013.01); *F21V 21/08* (2013.01); *F21V 23/005* (2013.01); *F21V 33/0008* (2013.01); *H05B 47/155* (2020.01); *F21Y 2113/17* (2016.08); *F21Y 2115/10* (2016.08)

(58) Field of Classification Search
CPC ........................... F21V 33/0008; F21V 23/005
See application file for complete search history.

(56) References Cited

U.S. PATENT DOCUMENTS

2008/0019119 A1* 1/2008 Marston ............... A43B 1/0072 36/137
2015/0359291 A1* 12/2015 Tseng .................. G01C 22/006 235/105

(Continued)

FOREIGN PATENT DOCUMENTS

CN 204420921 U 6/2015
TW 201804047 A 2/2018

(Continued)

OTHER PUBLICATIONS

Taiwan Intellectual Property Office Notice of Office Action on Feb. 7, 2025.

*Primary Examiner* — William N Harris
(74) *Attorney, Agent, or Firm* — WPAT, PC

(57) ABSTRACT

A luminous device includes a flexible circuit board, a battery, a plurality of predetermined color light-emitting diodes, a sensor and a control chip. The battery, the predetermined color light-emitting diodes, the sensor and the control chip are arranged on the flexible circuit board. The sensor is configured to detect an external force to generate a control signal. The control chip is connected to the sensor, the predetermined color light-emitting diodes and the battery. The control chip is configured to receive the control signal and select a lighting mode according to the control signal to control the predetermined color light-emitting diodes emit light. The luminous device of the invention uses the flexible circuit board to sense the external force to emit light without requiring external circuits, so as to reduce the overall volume. Moreover, the luminous device of the invention can be installed or attached on any detachable object.

22 Claims, 11 Drawing Sheets

(51) Int. Cl.

| | |
|---|---|
| ***F21V 33/00*** | (2006.01) |
| ***F21Y 113/17*** | (2016.01) |
| ***F21Y 115/10*** | (2016.01) |
| ***H05B 47/155*** | (2020.01) |

(56) References Cited

U.S. PATENT DOCUMENTS

| | | | | |
|---|---|---|---|---|
| 2016/0320004 | A1* | 11/2016 | Tudorica | F21V 29/83 |
| 2017/0156187 | A1 | 6/2017 | Yamashita | |
| 2021/0041094 | A1* | 2/2021 | Tseng | F21V 23/009 |

FOREIGN PATENT DOCUMENTS

| | | | |
|---|---|---|---|
| TW | M590342 | U | 2/2020 |
| TW | 202129196 | A | 8/2021 |
| TW | M649136 | U | 12/2023 |

* cited by examiner

LUMINOUS DEVICE AND WEARABLE OBJECT WITH THE SAME

BACKGROUND OF THE INVENTION

1. Field of the Invention

The present invention relates to a luminous device, particularly to aluminous device that is integrated with a predetermined color light-emitting diode, a sensor, and a chip on a flexible circuit board.

2. Description of the Prior Art

With the continuous development of technology, the demand for wearable devices is also increasing. Wearable devices not only provide practical functions but can also serve as decorative accessories. For example, in recent years, luminous device have been integrated into shoes which not only can alert pedestrians but also be as a decorative effect.

However, rigid circuit boards are typically used in shoes to provide lighting function in the prior art, which means, battery and controllers will be arranged on the rigid circuit boards, and the predetermined color light-emitting diodes (such as LED chips) will be connected to the rigid circuit boards with wires. Because rigid circuit boards need to be packaged, rigid circuit boards are usually placed in the shoe sole. However, rigid circuit boards, placed in the shoe sole, increase the weight of the shoes, takes up space, and complicates the installation process. Once installed in the shoe, the conventional rigid circuit boards cannot be updated with new lighting modes or adjusted in any way.

When the rigid circuit boards are designed in shoes in the prior art, additional external wires are needed to electrically connect multiple predetermined color light-emitting diodes to the rigid circuit boards. However, when more luminous devices or multiple lighting modes are required, more external wires are needed to meet design requirements. Furthermore, if the predetermined color light-emitting diodes need to be placed differently, wires with varying lengths are required. These issues lead to inconvenience in production and installation, significantly increase the weight of the shoes, and may affect their comfort and appearance.

Moreover, shoes with lighting function are typically used different colors of predetermined color light-emitting diodes in the prior art. For example, luminous components that emit red light, yellow light, yellow-green light, or orange light (such as red LED chips, yellow LED chips, and orange LED chips) require a lower driving voltage or operating voltage Vf (e.g., 1.8 to 2.4V). Whereas a luminous component that emits blue light, such as a blue LED chip, requires a higher driving or operating voltage Vf (e.g., 3V). When the red luminous component of the shoe is activated, the luminous device needs to output the driving voltage corresponding to the operating voltage Vf of the red luminous component. However, when the luminous device switches to emit the blue luminous component, the luminous device needs to output higher driving voltage to drive the blue luminous chip, thereby increasing the complexity of the power supply circuit design. On the other hand, when the red LED chip with lower Vf lights up, the chip will control the battery voltage to meet the low Vf voltage to emit the red LED. However, when the blue LED needs to be emit light, the battery voltage hasn't recovered to a sufficient level. Thus, the high Vf blue LED chip will not light up, leading to insufficient lifespan.

Therefore, it is necessary to provide a luminous device that effectively simplifies and lightens the circuit board and is easy to replace from the prior art.

SUMMARY OF THE INVENTION

Therefore, the present invention provides a luminous device to solve the problems of the prior art.

According to an embodiment of the present invention, the luminous device includes a flexible circuit board, a battery, a plurality of predetermined color light-emitting diodes, a sensor and a control chip. The battery is arranged on the flexible circuit board. The flexible circuit board includes a first connecting component and a second connecting component. Wherein, the first connecting component extended along a side wall of the battery and connected to a first electrode of the battery, and the second connecting component is connected to a second electrode of the battery without bypassing the side wall of the battery. The plurality of predetermined color light-emitting diodes are arranged on the flexible circuit board and electrically coupled with the battery. The plurality of predetermined color light-emitting diodes include a first predetermined color light-emitting diode and a second predetermined color light-emitting diode. The first predetermined color light-emitting diode includes a first light-emitting diode chip and a first phosphor layer coated on the first light-emitting diode chip. The second predetermined color light-emitting diode includes a second light-emitting diode chip. Wherein, each of the predetermined color light-emitting diodes has the same or substantially the same driving voltage. The sensor is arranged on the flexible circuit board and configured to detect an external force to generate a control signal. The control chip is arranged on the flexible circuit board and electrically coupled with the sensor, the plurality of predetermined color light-emitting diodes, and the battery. The control chip is configured to receive the control signal from the sensor and select a lighting mode according to the control signal to control the plurality of predetermined color light-emitting diodes to emit light.

Wherein, a lighting color of the first predetermined color light-emitting diode is different from a lighting color of the second predetermined color light-emitting diode. Wherein, the lighting color of the first predetermined color light-emitting diode is red-tinted, green-tinted, yellow-tinted, orange-tinted, cyan green-tinted, lime green-tinted, purple-tinted, pink-tinted, ice blue-tinted, or white-tinted. Wherein, the first light-emitting diode chip and the second light-emitting diode chip are blue light-emitting diode chips, and the second predetermined color light-emitting diode is not coated with a phosphor layer.

Wherein, the plurality of predetermined color light-emitting diodes further include a third predetermined color light-emitting diode. The third predetermined color light-emitting diode includes a third light-emitting diode chip and a third phosphor layer coated on the third light-emitting diode chip. Wherein, a lighting color of the third predetermined color light-emitting diode is different from the light color of the second predetermined color light-emitting diode.

Wherein, the lighting color of the first predetermined color light-emitting diode is orange-tinted, cyan green-tinted, lime green-tinted, purple-tinted, pink-tinted, ice blue-tinted, or white-tinted. The second predetermined color light-emitting diode further comprises a second phosphor layer coated on the second light-emitting diode chip, and the lighting color of the second predetermined color light-emitting diode is orange-tinted, cyan green-tinted, lime green-tinted, purple-tinted, pink-tinted, ice blue-tinted, or white-tinted. Wherein, both the first light-emitting diode chip and the second light-emitting diode chip are blue light-emitting diode chips.

Wherein, the plurality of predetermined color light-emitting diodes are arranged on a first side of the flexible circuit board, and the battery are arranged on a second side of the flexible circuit board corresponding to the first side. Wherein, one end of the first connecting component is soldered to the first side of the flexible circuit board, and one end of thesecond connecting component is soldered to the first side of the flexible circuit board and the second connecting component passes through the flexible circuit board.

Wherein, the flexible circuit board has a cavity, and the sensor is arranged within the cavity, wherein the width of the cavity is smaller than the width of the sensor.

Wherein, a case of the sensor is electrically connected to a first side of the flexible circuit board, and an electrode of the sensor is electrically connected to the first side or a second side of the flexible circuit board.

Wherein, the maximum width of the flexible circuit board is the same as or greater than the diameter of the battery.

Wherein, the lighting mode includes a sequential flashing mode, a synchronous flashing mode, a reciprocating flashing mode, an alternating flashing mode, a marquee flashing mode, a gradual brightening and dimming mode, and a gradual dimming and brightening mode.

The present invention provides another luminous device includes a circuit board, a battery, a plurality of predetermined color light-emitting diodes, a sensor and a control chip. The battery is arranged on the circuit board. The plurality of predetermined color light-emitting diodes are electrically coupled with the battery. The plurality of predetermined color light-emitting diodes include a first predetermined color light-emitting diode and a second predetermined color light-emitting diode. The first predetermined color light-emitting diode includes a first light-emitting diode chip and a first phosphor layer coated on the first light-emitting diode chip. The second predetermined color light-emitting diode includes a second light-emitting diode chip. Wherein, each of the predetermined color light-emitting diodes has the same or substantially the same driving voltage. The sensor is arranged on the circuit board and configured to detect an external force to generate a control signal. The control chip is arranged on the circuit board and electrically coupled with the sensor, the plurality of predetermined color light-emitting diodes, and the battery. The control chip is configured to receive the control signal from the sensor and select a lighting mode according to the control signal for driving the plurality of predetermined color light-emitting diodes to emit light according to the control signal. Wherein, the lighting mode includes a first lighting sequence and a second lighting sequence following the first lighting sequence. The plurality of predetermined color light-emitting diodes emit light at a first flashing frequency in the first lighting sequence. The plurality of predetermined color light-emitting diodes emit light at a second frequency in the second lighting sequence. Wherein, the second flashing frequency is different from the first flashing frequency.

Wherein, both the first light-emitting diode chip and the second light-emitting diode chip are blue light-emitting diode chips, and the second predetermined color light-emitting diode is not coated with a phosphor layer.

Wherein, the plurality of predetermined color light-emitting diodes further include a third predetermined color light-emitting diode. The third predetermined color light-emitting diode includes a third light-emitting diode chip and a third phosphor layer coated on the third light-emitting diode chip. Wherein, a lighting color of the third predetermined color light-emitting diode is different from a lighting color of the second predetermined color light-emitting diode, and the third light-emitting diode chip is blue light-emitting diode chip.

Wherein, the plurality of predetermined color light-emitting diodes emit light sequentially at the first flashing frequency in the first lighting sequence. The plurality of predetermined color light-emitting diodes emit light sequentially at the second frequency in the second lighting sequence. Wherein, the second flashing frequency is a gradually-changing frequency.

Wherein, the lighting duration for each predetermined color light-emitting diode is the same in the first lighting sequence, and two lighting durations of two adjacent predetermined color light-emitting diodes are contiguous, or a non-lighting period is between the two lighting durations of the two adjacent predetermined color light-emitting diodes.

Wherein, the plurality of predetermined color light-emitting diodes emit light sequentially by N times at the first flashing frequency in the first lighting sequence, and the plurality of predetermined color light-emitting diodes emit light simultaneously at the second flashing frequency in the second lighting sequence.

The present invention provides another luminous device includes a circuit board, a battery, a plurality of predetermined color light-emitting diodes, a sensor, a counter and a control chip. The battery is arranged on the circuit board. The plurality of predetermined color light-emitting diodes are electrically coupled with the battery. The plurality of predetermined color light-emitting diodes include a first predetermined color light-emitting diode and a second predetermined color light-emitting diode. The first predetermined color light-emitting diode includes a first light-emitting diode chip and a first phosphor layer coated on the first light-emitting diode chip. The second predetermined color light-emitting diode includes a second light-emitting diode chip. Wherein, each of the predetermined color light-emitting diodes has the same or substantially the same driving voltage. The sensor is arranged on the circuit board and configured to detect an external force to generate a control signal. The counter is configured to count the number of the control signal generated by the sensor for selectively generating a counting signal. The control chip is arranged on the circuit board and electrically coupled with the sensor, the counter, the plurality of predetermined color light-emitting diodes, and the battery. Wherein, the control chip includes a memory device stored with a plurality of lighting modes, and the control chip selects a lighting mode from the plurality of lighting modes to drive the plurality of predetermined color light-emitting diodes to emit light according to the control signal and the counting signal.

Wherein, both the first light-emitting diode chip and the second light-emitting diode chip are blue light-emitting diode chips, and the second predetermined color light-emitting diode is not coated with a phosphor layer.

Wherein, the plurality of predetermined color light-emitting diodes further includes a third predetermined color light-emitting diode. The third predetermined color light-emitting diode includes a third light-emitting diode chip and a third phosphor layer coated on the third light-emitting diode chip. Wherein, a light color of the third predetermined color light-emitting diode is different from a light color of the second predetermined color light-emitting diode, and the third light-emitting diode chip is blue light-emitting diode chip.

Wherein, the lighting mode includes a sequential flashing mode, a synchronous flashing mode, a reciprocating flashing mode, an alternating flashing mode, a marquee flashing mode, a gradual brightening and dimming mode, and a gradual dimming and brightening mode.

The present invention provides another luminous device includes a circuit board, a battery, a plurality of predetermined color light-emitting diodes, a sensor, and a control chip. The battery is arranged on the circuit board. The plurality of predetermined color light-emitting diodes are electrically coupled with the battery. The plurality of predetermined color light-emitting diodes include a first predetermined color light-emitting diode, a second predetermined color light-emitting diode, and a third predetermined color light-emitting diode. The first predetermined color light-emitting diode includes a first light-emitting diode chip and a first phosphor layer coated on the first light-emitting diode chip. The second predetermined color light-emitting diode includes a second light-emitting diode chip. The third predetermined color light-emitting diode includes a third light-emitting diode chip and a third phosphor layer coated on the third light-emitting diode chip. Wherein, each of the predetermined color light-emitting diodes has the same or substantially the same driving voltage. The sensor is arranged on the circuit board and configured to detect an external force to generate a control signal. The control chip is arranged on the circuit board and electrically coupled with the sensor, the plurality of predetermined color light-emitting diodes, and the battery. Wherein the control chip is configured to receive the control signal from the sensor and select a lighting mode to drive the plurality of predetermined color light-emitting diodes to emit light according to the control signal. Wherein, the lighting mode includes a first lighting sequence and a second lighting sequence following the first lighting sequence. The plurality of predetermined color light-emitting diodes sequentially emit light at least once in the first lighting sequence. The plurality of predetermined color light-emitting diodes simultaneously emit light at least once in the second lighting sequence.

Wherein, the second predetermined color light-emitting diode is not coated with a phosphor layer. The first light-emitting diode chip, the second light-emitting diode chip and the first light-emitting diode chip are blue light-emitting diode chips. Wherein, a lighting color of the first predetermined color light-emitting diode and a lighting color of the third predetermined color light-emitting diode are different from a lighting color of the second predetermined color light-emitting diode.

Wherein, the first side and the second side of the flexible circuit board respectively comprise a plurality of circuit lines laid flat on the flexible circuit board, and the battery, the sensor, the plurality of predetermined color light-emitting diodes, and the control chip are electrically connected through the circuit lines.

Wherein, the plurality of predetermined color light-emitting diodes are blue light-emitting diode chips.

Wherein, the lighting mode includes an alternate flashing mode and a marquee flashing mode. In the alternate flashing mode, the control chip drives the plurality of predetermined color light-emitting diodes to flash alternately. In the marquee flashing mode, the control chip drives the plurality of predetermined color light-emitting diodes to flash sequentially in a marquee manner.

Wherein, when the control chip selects the marquee flashing mode, the control chip controls each predetermined color light-emitting diode to sequentially emit light once to form a lighting cycle, and repeats the lighting cycle N times, where N is an integer greater than 0.

Wherein, when the control chip selects the marquee flashing mode, the control chip controls each predetermined color light-emitting diode to sequentially emit light once in reverse order after emitting light once in sequence to form a lighting cycle, and repeats the lighting cycle N times, where N is an integer greater than 0.

Wherein, when the control chip selects the alternate flashing mode, the control chip controls every two predetermined color light-emitting diodes to sequentially emit light twice to form a lighting cycle, and repeats the lighting cycle N times, where N is an integer greater than 0.

Wherein, the lighting mode further includes a first lighting sequence and a second lighting sequence. The control chip drives the predetermined color light-emitting diodes to emit light at a fixed frequency according to the first lighting sequence and then at a progressively changing frequency according to the second lighting sequence.

The present invention provides another luminous device includes a sensor, a plurality of predetermined color light-emitting diodes, and a control chip. The sensor is configured to detect an external force to generate a control signal. Each predetermined color light-emitting diodes is selectively coated with a phosphor that the predetermined color light-emitting diodes emit light of a different color after the phosphor absorbing a predetermined color light by the predetermined color light-emitting diode, and each of the predetermined color light-emitting diodes has the same or substantially the same driving voltage. The control chip is electrically connected with the sensor and the predetermined color light-emitting diodes. The control chip stores a lighting mode. The control chip receives the control signal from the sensor and selects the lighting mode according to the control signal to control the plurality of predetermined color light-emitting diodes to emit light.

Wherein, the predetermined color light-emitting diodes are blue light-emitting diodes.

Wherein, the control chip controls each predetermined color light-emitting diode to sequentially emit light once to form a lighting cycle, and repeats the lighting cycle N times, where N is an integer greater than 0.

Wherein, the control chip controls each predetermined color light-emitting diode to sequentially emit light once in reverse order after emitting light once in sequence to form a lighting cycle, and repeats the lighting cycle N times, where N is an integer greater than 0.

Wherein, the control chip controls every two predetermined color light-emitting diodes to sequentially emit light twice to form a lighting cycle, and repeats the lighting cycle N times, where N is an integer greater than 0.

The present invention provides another luminous device includes a sensor, a plurality of predetermined color light-emitting diodes, and a control chip. The sensor is configured to detect an external force to generate a control signal. Each predetermined color light-emitting diodes is selectively coated with a phosphor that the predetermined color light-emitting diodes emit light of a different color after the phosphor absorbing a predetermined color light by the predetermined color light-emitting diode, and each of the predetermined color light-emitting diodes has the same or substantially the same driving voltage. The control chip is electrically connected with the sensor and the predetermined color light-emitting diodes. The control chip further stores a first lighting sequence and a second lighting sequence. The control chip receives the control signal generated by the sensor and drives the predetermined color light-emitting diodes to emit light according to the first lighting sequence at a fixed frequency, followed by emitting light according to the second lighting sequence at a progressively changing frequency.

Wherein, the predetermined color light-emitting diodes are blue light-emitting diodes.

The present invention provides a wearable object with lighting function includes a wearable object body and a luminous device arranged on the wearable object body. The luminous device includes a flexible circuit board, a battery, a plurality of predetermined color light-emitting diodes, a sensor and a control chip. The flexible circuit board includes a first connecting component and a second connecting component. The battery is arranged on the flexible circuit board. Wherein the first connecting component extended along a side wall of the battery and connected to a first electrode of the battery, and the second connecting component is connected to a second electrode of the battery without bypassing the side wall of the battery. The plurality of predetermined color light-emitting diodes are arranged on the flexible circuit board and electrically coupled with the battery. The plurality of predetermined color light-emitting diodes include a first predetermined color light-emitting diode and a second predetermined color light-emitting diode. The first predetermined color light-emitting diode comprising a first light-emitting diode chip and a first phosphor layer coated on the first light-emitting diode chip. The second predetermined color light-emitting diode comprising a second light-emitting diode chip. Wherein, each of the predetermined color light-emitting diodes has the same or substantially the same driving voltage. The sensor is arranged on the flexible circuit board and configured to detect an external force to generate a control signal. The control chip is arranged on the flexible circuit board and electrically coupled with the sensor, the plurality of predetermined color light-emitting diodes, and the battery. The control chip is configured to receive the control signal from the sensor and select a lighting mode according to the control signal to control the plurality of predetermined color light-emitting diodes to emit light.

In summary, the present invention provides a luminous device, which can directly be placed on the surface of the flexible circuit board without external wires through the circuit lines in the flexible circuit board for significantly reducing the overall size. Additionally, the luminous device of the present invention can provide multiple lighting modes without increasing complexity of the circuit or adding external wires for the chip to select the corresponding lighting mode according to the control signal detected by the sensor.

BRIEF DESCRIPTION OF THE APPENDED DRAWINGS

DETAILED DESCRIPTION OF THE INVENTION

Figure 1:
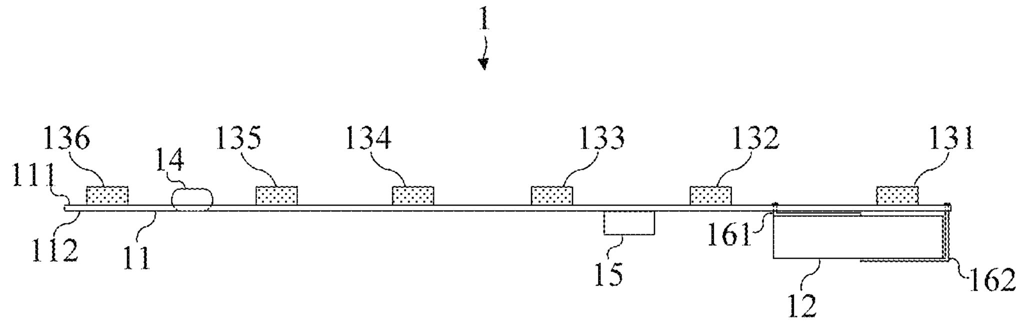
FIG. 1 is a structural schematic diagram illustrating a luminous device in an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of the present invention, it is to be understood that the orientations or positional relationships of the terms "longitudinal, lateral, upper, lower, front, rear, left, right, top, bottom, inner, outer" and the like are according to the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
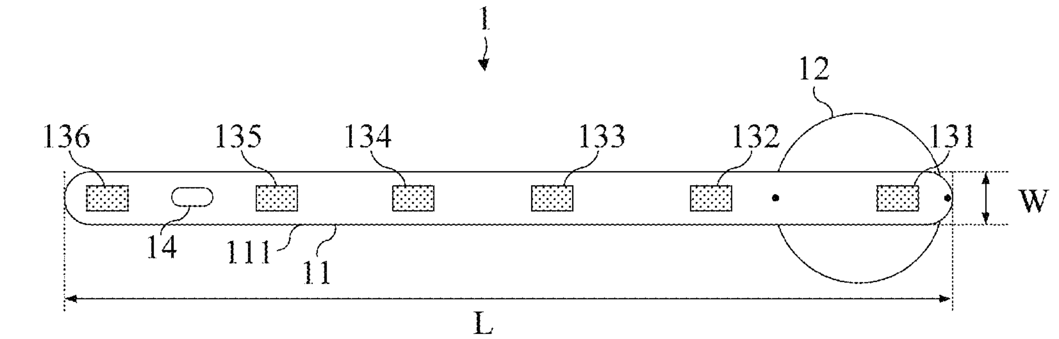
FIG. 2 is a structural schematic diagram illustrating the luminous device of FIG. 1 in another perspective view.

Please refer to FIG. 1 and FIG. 2.FIG. 1 is a structural schematic diagram illustrating a luminous device 1 in an embodiment of the present invention.FIG. 2 is a structural schematic diagram illustrating the luminous device 1 of FIG. 1 in another perspective view. As shown in FIG. 1 and FIG. 2, the luminous device 1 includes a flexible circuit board 11 (length: L; width: W), a battery 12, a plurality of predetermined color light-emitting diodes 131, 132, 133, 134, 135, 136, a sensor 14 and a control chip 15. Wherein, the battery 12, the predetermined color light-emitting diodes 131~136, the sensor 14 and the control chip 15 are arranged on the flexible circuit board 11. The width W of the flexible circuit board 11 is less than the width or diameter of the battery 12. The sensor 14 can be a motion sensor and used to detect external forces to generate control signals. The control chip 15 is connected to the battery 12, the predetermined color light-emitting diodes 131~136, and the sensor 14. The control chip 15 selects a lighting mode according to the control signal or sensing signal detected by the sensor 14, and supplies power from the battery 12 to drive the predetermined color light-emitting diodes 131~136 to emit light according to the lighting mode.

Figure 3:
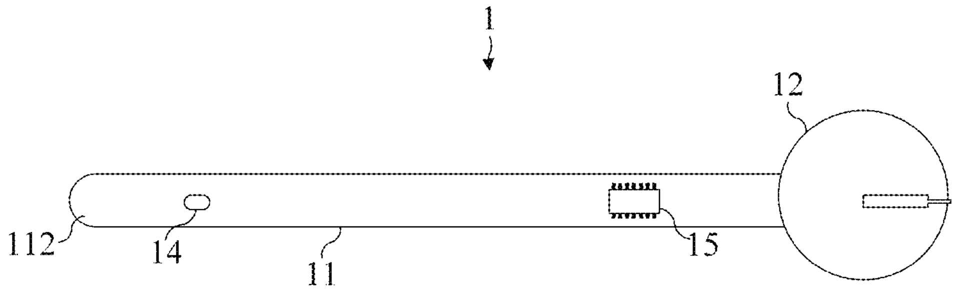
FIG. 3 is a structural schematic diagram illustrating the luminous device of FIG. 1 in another perspective view.

In practice, the flexible printed circuit board (FPCB) is a double-sided board. Please refer to FIGS. 1, 2, and 3. FIG. 3 is a structural schematic diagram illustrating the luminous device 1 of FIG. 1 in another perspective view. As shown in FIG. 2, the predetermined color light-emitting diodes 131~136 and the sensor 14 are arranged on the first side 111 of the flexible circuit board 11; as shown in FIG. 3, the control chip 15 and the battery 12 can be arranged on the second side 112 corresponding to the first side 111. In other words, the luminous device 1 of the invention can be arranged on the surface of any product, and the first side 111 can face outward to emit light. Additionally, the control chip 15 and the battery 12 are arranged on the second side 112 of the flexible circuit board 11, thereby saving space on the first side 111 of the flexible circuit board 11 and being more conducive to the arrangement of the predetermined color light-emitting diodes 131~136. Moreover, the arrangement of the predetermined color light-emitting diodes is not limited as the single row arrangement shown in FIG. 1 to FIG. 3, the arrangement of the predetermined color light-emitting diodes but also can be arranged more flexibly (e.g., in staggered arrangement) to make the light emitted by the luminous device 1 more variable.

Furthermore, each of the first side 111 and the second side 112 of the flexible circuit board 11 contains multiple circuit lines (not shown in the figure) which are laid flat on the flexible circuit board 11 to allow the battery 12, the predetermined color light-emitting diodes 131~136, the sensor 14, and the control chip 15 to be electrically connected through the circuit lines. Compared with the prior art, the control chip 15 and the battery 12 are arranged on the rigid circuit board, while the predetermined color light-emitting diodes are positioned away from the rigid circuit board and arranged on a wearable object. In this situation, it is necessary to install external wires to connect the predetermined color light-emitting diodes to the rigid circuit board. Therefore, the luminous device of the invention uses the flexible circuit board, which can be designed with transmission line characteristic by controlling capacitance, inductance, and characteristic impedance, to allow the predetermined color light-emitting diodes, the control chip 15, and the battery 12 can be directly arranged on the surface of the flexible circuit board. Additionally, since the flexible circuit board is not restricted by external wires, the predetermined color light-emitting diodes can be freely installed at various positions on different wearable objects. Therefore, the flexible circuit board of the luminous device of the present invention can simplify the overall circuit structure design, reduce external wires, and consequently lower the overall size.

Furthermore, as shown in FIG. 1, the flexible circuit board 11 can further include two sets of connecting components. One end of the connecting component 161 connects to the positive terminal of the battery 12 and the flexible circuit board 11; the other connecting component 162 connects to the negative terminal of the battery 12 and the flexible circuit board 11. For example, one end of the connecting component 161 connects or is soldered to the first side 111 of the flexible circuit board 11, and bypasses the side wall of the battery 12 to be soldered to the positive terminal of the battery 12.One end of the connecting component 162 connects or is soldered to the first side 111 of the flexible circuit board 11 without bypassing the side wall of the battery 12 and is directly soldered to the negative terminal of the battery 12. Wherein, the connecting component 162 can pass through the flexible circuit board 11. In practice, the battery can be a primary battery such as a carbon-zinc battery or an alkaline battery, as well as a rechargeable secondary battery or a battery rechargeable via a USB port.

Figure 4:
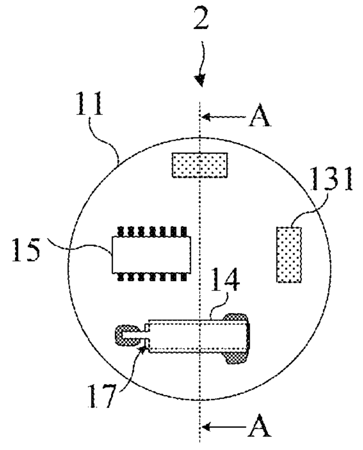
FIG. 4 is a structural schematic diagram illustrating a luminous device in another embodiment of the present invention.
Figure 5:
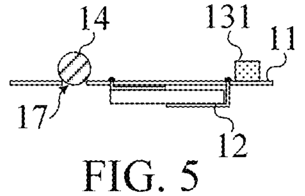
FIG. 5 is a sectional diagram illustrating the luminous device along line A-A of FIG. 4 in another perspective view.
Figure 6:
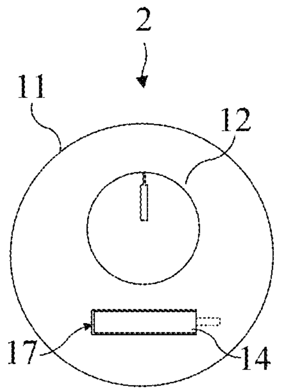
FIG. 6 is a structural schematic diagram illustrating the luminous device of FIG. 4 in another perspective view.

By using the flexible circuit board of the invention, it can effectively reduce external wires to decrease the overall size and freely adjust the overall dimensions of the luminous device according to design requirements. Additionally, the shape of the flexible circuit board of the present invention is not limited to the elongated shape described in the aforementioned embodiment, the flexible circuit board can also be other shapes. The following provides another embodiment. Please refer to FIG. 4 to and FIG. 6.FIG. 4 is a structural schematic diagram illustrating a luminous device 2 in another embodiment of the present invention.FIG. 5 is a sectional diagram illustrating the luminous device 2 along line A-A of FIG. 4 in another perspective view.FIG. 6 is a structural schematic diagram illustrating the luminous device 2 of FIG. 4 in another perspective view. As shown in FIG. 4 to and FIG. 6, the flexible circuit board 11 of the luminous device 2 in this specific embodiment can be circular and further includes a cavity 17. The sensor 14 is arranged within the cavity 17.It should be noted that the width of the cavity 17 is smaller than the width of sensor 14 (i.e., the diameter of the cylindrical sensor 14). Therefore, as shown in FIG. 5, when the sensor 14 is arranged in the cavity 17, one side of the sensor 14 can be positioned within the cavity 17.

For example, if the width (diameter) of the sensor 14 is 1.96 mm, the width of the cavity 17 can be 1.85 mm. In this present embodiment, the predetermined color light-emitting diodes 131, the control chip 15 and the sensor 14 can be installed on the front side (i.e., the first side) of the flexible circuit board 11, while the battery 12 can be flatly attached to the back side (i.e., the second side) of the flexible circuit board 11. Wherein, the case (negative terminal) and the positive terminal of the sensor 14 can be electrically connected to the negative terminal on the front side and the positive terminal of the flexible circuit board 11 by soldering. The battery 12 can be connected to the negative and positive terminals of the flexible circuit board 11 through two connecting components, as described in the aforementioned specific embodiment. Additionally, in practice, the maximum width of the flexible circuit board 11 can be equal to or greater than the diameter of the battery 12.For example, the flexible circuit board 11 can cover the entire battery 12, so the battery 12 is not visible when viewed directly from the first side of the flexible circuit board 11, or the length and width of the flexible circuit board 11 can be equal to or greater than the diameter of the battery 12.

In the specific embodiment, the predetermined color light-emitting diodes 131~136 of the luminous device 1 can be light-emitting diode with different colors, such as red-tinted, green-tinted, yellow-tinted, orange-tinted, cyan green-tinted, lime green-tinted, purple-tinted, pink-tinted, ice blue-tinted, or white-tinted. However, in practice, the different colored light-emitting diode all include the same type of LED control chip, such as blue light-emitting diode chip, and can be coated different colors or proportions of phosphor on the surface of the blue light LED. These phosphors emit different colors of light after absorbing the blue light by the blue light-emitting diode chip. For example, the red LED is created by coating the blue LED control chip with red phosphor to emit red light; the green LED is created by coating the blue LED control chip with green phosphor to emit green light, and so on. Thus, the predetermined color light-emitting diodes of the luminous device 1 can emit different colors light by coated different colors phosphor layers. Since all the predetermined color light-emitting diodes in the luminous device 1 use the same type of light-emitting diode chip (such as a blue light-emitting diode chip), each of the predetermined color light-emitting diodes has the same or substantially the same driving voltage or operating voltage (Vf). For example, even with the same blue light-emitting diode chip, the driving voltage may have slight variations due to the manufacturing process, such as having a nominal value of 3V with possible deviations in the range of +1% ~5%, e.g., between 2.85V~3.15V, 2.9V~3.1V, or 2.97V~3.03V).

With the aforementioned technical method, even if several predetermined color light-emitting diodes in the luminous device emit different colors, the battery can continuously and stably output the same voltage, thereby extending the lifespan of the luminous device. Moreover, the predetermined color light-emitting diodes 131~136of the luminous device 1 in the embodiment can include at least one predetermined color light-emitting diode, which is blue light-emitting diode chip without coating the phosphor layer, to emit blue light. For example, the predetermined color light-emitting diodes 131~136 can be the first predetermined color light-emitting diode 131, the second predetermined color light-emitting diode 132, the third predetermined color light-emitting diode 133, the fourth predetermined color light-emitting diode 134, the fifth predetermined color light-emitting diode 135, and the sixth predetermined color light-emitting diode 136. Among these, the first, and the third to the sixth predetermined color light-emitting diodes are coated with phosphor layers on the control chips, while the second predetermined color light-emitting diode does not coat the phosphor layer, thus emitting blue light.

In the prior art, it uses different colors light-emitting diodes to display various lighting color changes. However, when switching between different colors light-emitting diodes, the battery needs to switch to the corresponding output voltage to drive the Light-emitting diode. Frequent switching will lead to the battery voltage changing too slowly, which will reduce the lifespan of the battery and the predetermined color light-emitting diodes. Therefore, compared with prior art, the luminous device of the invention also has the advantage of a longer lifespan.

Figure 7A:
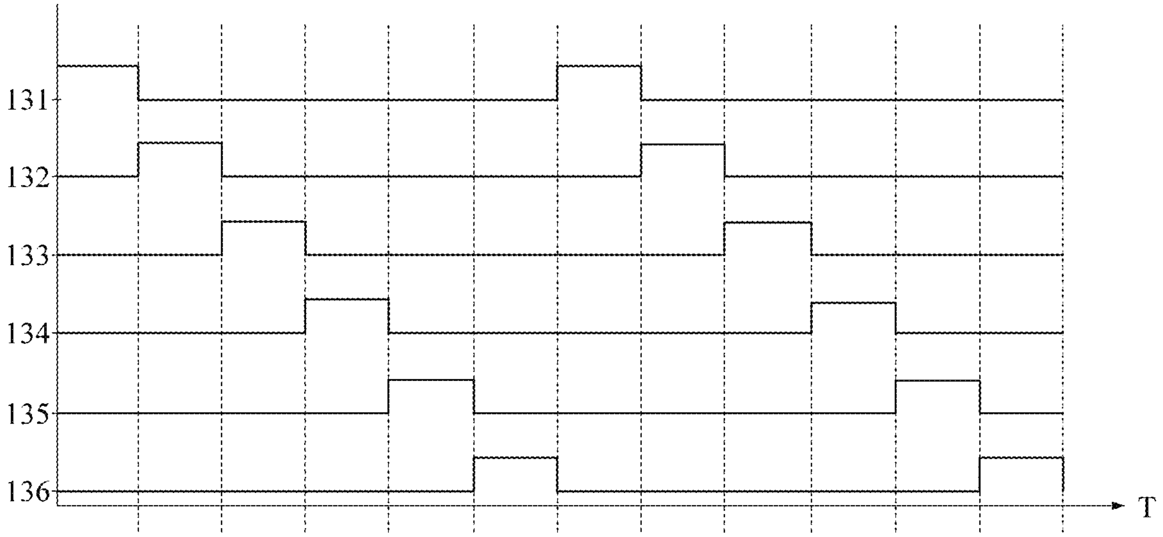
FIG. 7A is a schematic diagram illustrating the input signal of the predetermined color light-emitting diodes according to FIG. 1.
Figure 7B:
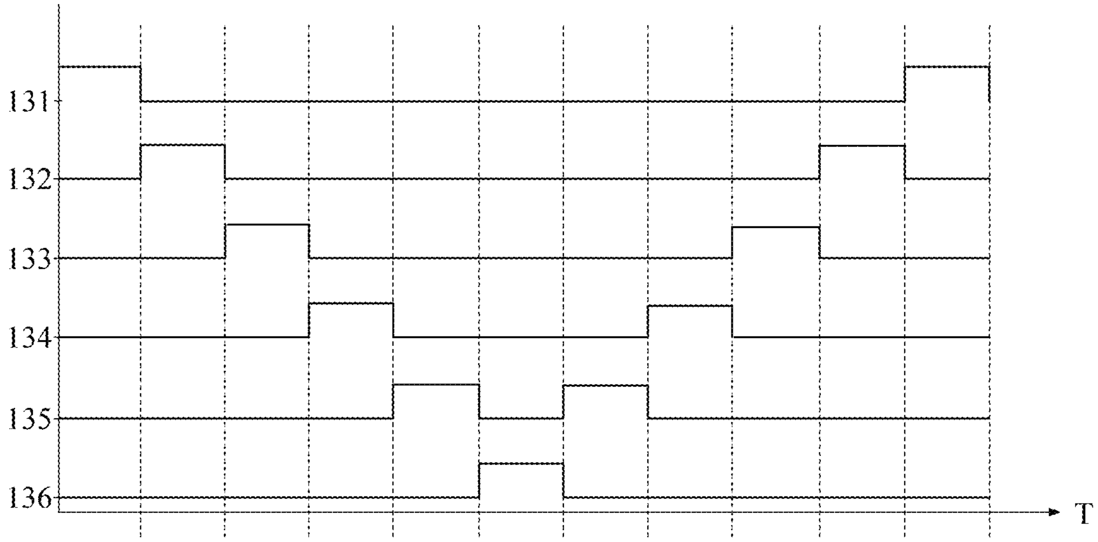
FIG. 7B is a schematic diagram illustrating the input signal of the predetermined color light-emitting diodes according to FIG. 1.
Figure 7C:
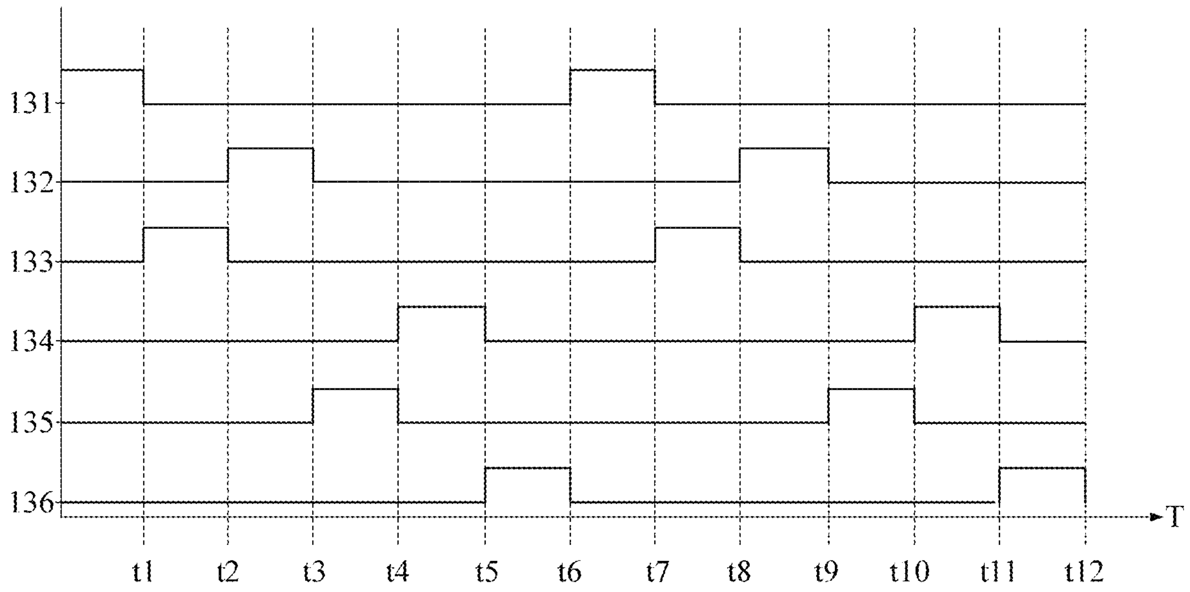
FIG. 7C is a schematic diagram illustrating the input signal of the predetermined color light-emitting diodes according to FIG. 1.
Figure 7D:
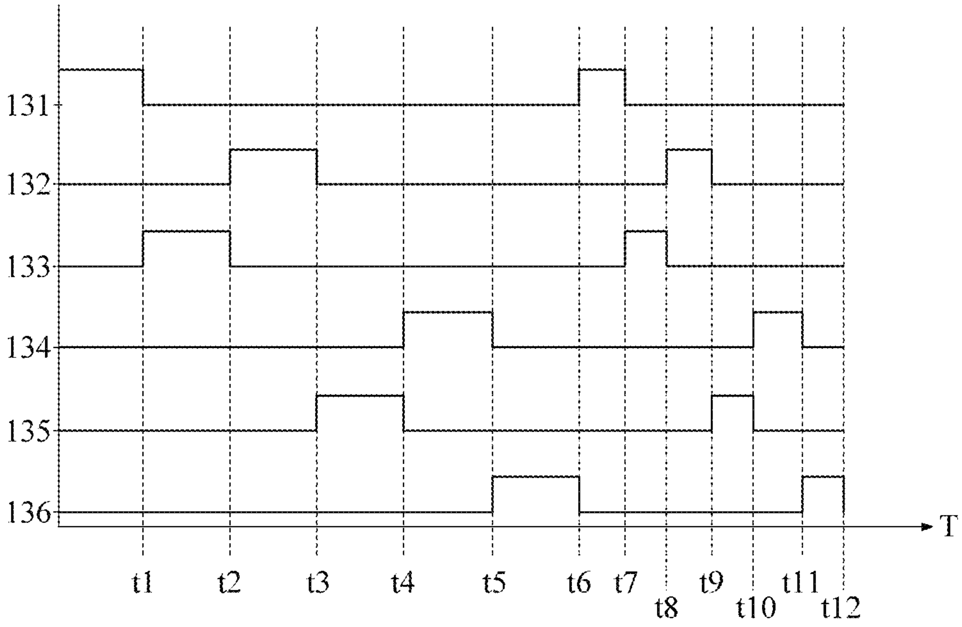
FIG. 7D is a schematic diagram illustrating the input signal of the predetermined color light-emitting diodes according to FIG. 1.
Figure 7E:
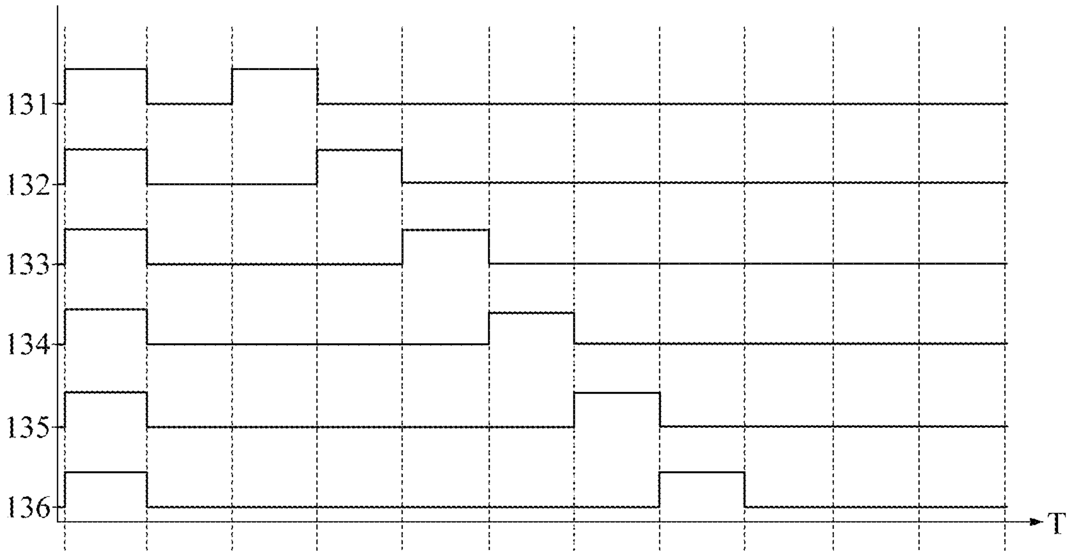
FIG. 7E is a schematic diagram illustrating the input signal of the predetermined color light-emitting diodes according to FIG. 1.
Figure 7F:
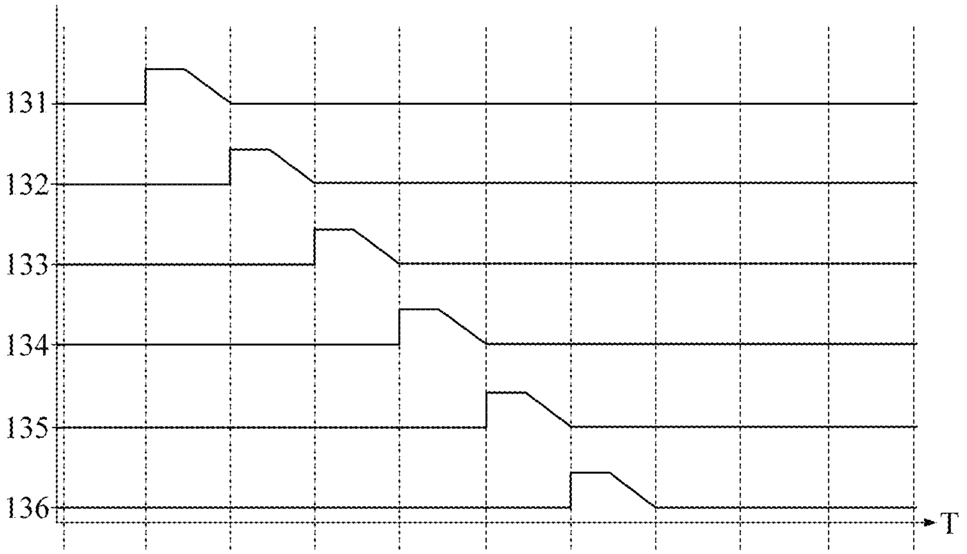
FIG. 7F is a schematic diagram illustrating the input signal of the predetermined color light-emitting diodes according to FIG. 1.
Figure 7G:
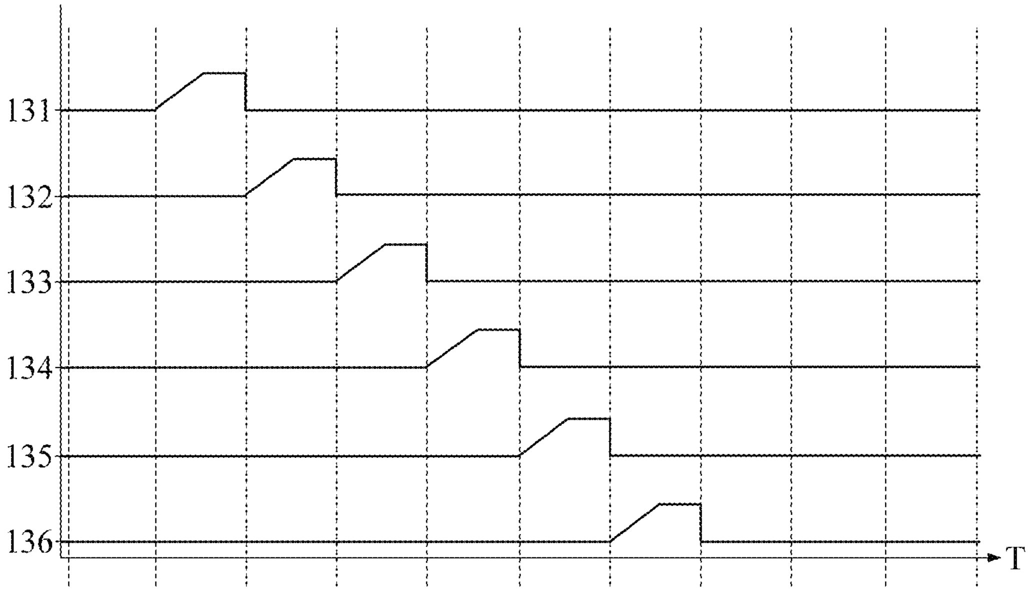
FIG. 7G is a schematic diagram illustrating the input signal of the predetermined color light-emitting diodes according to FIG. 1.
Figure 7H:
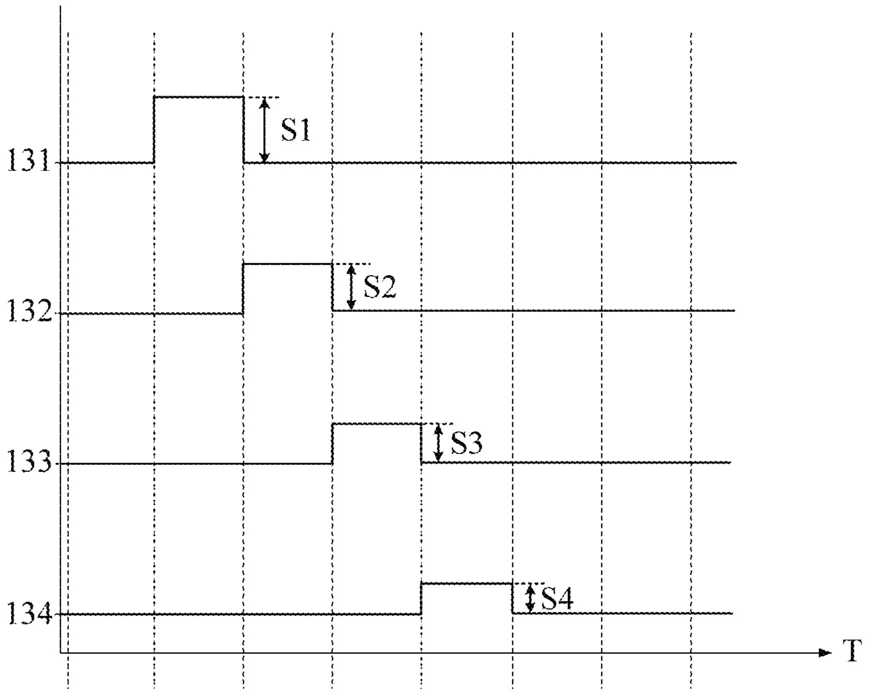
FIG. 7H is a schematic diagram illustrating the input signal of the predetermined color light-emitting diodes according to FIG. 1.

Furthermore, besides the advantages of small size and long lifespan, the luminous device of the present invention also pre-stores multiple lighting modes in the control chip (such as in the memory of the control chip). Please refer to FIG. 2, FIG. 7A to FIG. 7H. FIG. 7A is a schematic diagram illustrating the input signal of the predetermined color light-emitting diodes according to FIG. 1.FIG. 7B is a schematic diagram illustrating the input signal of the predetermined color light-emitting diodes according to FIG. 1.FIG. 7C is a schematic diagram illustrating the input signal of the predetermined color light-emitting diodes according to FIG. 1.FIG. 7D is a schematic diagram illustrating the input signal of the predetermined color light-emitting diodes according to FIG. 1.FIG. 7E is a schematic diagram illustrating the input signal of the predetermined color light-emitting diodes according to FIG. 1.FIG. 7F is a schematic diagram illustrating the input signal of the predetermined color light-emitting diodes according to FIG. 1.FIG. 7G is a schematic diagram illustrating the input signal of the predetermined color light-emitting diodes according to FIG. 1.FIG. 7H is a schematic diagram illustrating the input signal of the predetermined color light-emitting diodes according to FIG. 1. Wherein, in FIG. 7A to FIG. 7H, the horizontal axis represents time, and the vertical axis represents the numbers of the predetermined color light-emitting diodes 131, 132, 133, 134, 135, and 136. Each diagram from FIG. 7A to FIG. 7H illustrates one lighting cycle of a specific lighting mode.

As shown in FIG. 7A, when the control chip 15 selects the lighting mode of FIG. 7A according to the external force value or the control signal detected by the sensor, the control chip 15 drives the predetermined color light-emitting diodes 131~136 to emit light once in sequence to form a lighting cycle, and repeats the lighting cycle N times, where N is an integer greater than 0, so as to create a sequential flashing effect. Furthermore, the flashing direction is not limited hereto. As shown in FIG. 7B, the control chip 15 drives the predetermined color light-emitting diodes 131~136 to emit light once in sequence, and then emit light in reverse order from predetermined color light-emitting diode 136 to 131. From the perspective shown in FIG. 2, this would appear as a lighting cycle moving from right to left and then from left to right, and then repeat this lighting cycle N times, where N is an integer greater than 0.

In addition, in another embodiment, the predetermined color light-emitting diodes 131, 133, 132, 135, 134, and 136 can emit light in the aforementioned sequential flashing or reciprocating flashing mode once or twice, and then flash again one or more times in the same sequence. However, the duration or frequency of the flashing can differ from the initial sequential flashing duration or frequency to create a visual effect with different flashing frequencies. For example, the duration of each subsequent flashing can progressively lengthen or shorten, or the flashing frequency of the subsequent flashes can gradually increase or decrease.

Next, in addition to the aforementioned lighting mode, the control chip can also pre-store other lighting modes. As shown in FIG. 7C, the control chip 15 drives the predetermined color light-emitting diodes 131~136to sequentially emit light in the order of 131, 133, 132, 135, 134, and 136 to form a lighting cycle, and repeats the lighting cycle N times, where N is an integer greater than 0. In practice, the number of times each predetermined color light-emitting diode emit light and the lighting order are not limited hereto. For example, in another embodiment, each predetermined color light-emitting diode emits light M times in the aforementioned order. When M is 2, the predetermined color light-emitting diode 131 emits twice, followed by the predetermined color light-emitting diode 133 emits twice, where M is a natural number. In another embodiment, K predetermined color light-emitting diodes emit light at the same time. When K is 2, the predetermined color light-emitting diodes 131 and 133 emit light at the same time, where K is a natural number less than or equal to the total number of predetermined color light-emitting diodes.

Moreover, the lighting mode can be designed with different durations according to requirements. As shown in FIG. 7D, the difference between the lighting modes in FIG. 7D and FIG. 7C is that after the predetermined color light-emitting diode 136 finishes flashing at time t6, the predetermined color light-emitting diodes 131, 133, 132, 135, 134, and 136 flash in the same sequence one or several times. However, the flashing duration or frequency from time t6 to t12 can differ from the previous flashing duration or frequency to create a visual effect with different flashing frequencies. For example, the subsequent flashing duration of one or several flashes can gradually increase or decrease. The subsequent flashing frequency of one or several flashes can gradually speed up or slow down.

In addition to the aforementioned alternating flashing mode and marquee flashing mode, the present invention provides other types of lighting modes. As shown in FIG. 7E, the control chip first controls the predetermined color light-emitting diodes 131~136 to flash simultaneously once, and then controls each predetermined color light-emitting diode to flash sequentially at least once to form a lighting cycle, and repeat the lighting cycle N times, where N is an integer greater than 0. In other embodiments, the control chip can control all the predetermined color light-emitting diodes to flash simultaneously L times, where L is an integer greater than 0.

Furthermore, the lighting modes of the predetermined color light-emitting diodes can also include the control of flashing brightness to achieve different visual effects. As shown in FIG. 7F, the control chip can control the predetermined color light-emitting diode 131 to emit the maximum brightness and then gradually dim, and then the predetermined color light-emitting diodes 132~ 136 will follow the same lighting pattern sequentially. Additionally, as shown in FIG. 7G, the control chip can control the predetermined color light-emitting diode 131 to emit light that gradually brightens to a certain brightness and maintain the brightness until turning off. The predetermined color light-emitting diode 132~136 can follow the same lighting mode sequentially. Moreover, the aforementioned lighting mode (ie, adjustment brightness modes, such as gradual brightening and dimming mode or gradual dimming and brightening mode) can be further designed the ordering of the predetermined color light-emitting diodes according to requirements. For example, the predetermined color light-emitting diodes 131~136emit light that gradually becomes brighter or dimmer simultaneously. Additionally, the lighting mode of a single predetermined color light-emitting diode can also include the gradual brightening and dimming mode. Specifically, one predetermined color light-emitting diode can emit light that gradually brightens to a certain brightness and maintain the brightness and gradually dims.

Additionally, the present invention further provides another brightness adjustment lighting mode. As shown in FIG. 7H, the predetermined color light-emitting diode 131 has a luminous intensity S1, the predetermined color light-emitting diode 132 has a luminous intensity S2, the predetermined color light-emitting diode 133 has a luminous intensity S3, and the predetermined color light-emitting diode 134 has a luminous intensity S4. When the control chip sequentially controls the predetermined color light-emitting diodes 131 ~ 134 to emit light, the luminous intensity S4 is less than the luminous intensity S3, which is less than the luminous intensity S2, which is less than the luminous intensity S1, so as to create a visual effect where each subsequent predetermined color light-emitting diode with lower luminous intensity than the previous one.

In summary, users can store the aforementioned lighting mode, such as the sequential flashing mode, synchronous flashing mode, reciprocating flashing mode, alternating flashing mode, marquee flashing mode, or gradual brightening and dimming or the gradual dimming and brightening mode in the control chip according to requirements. In one embodiment, two lighting durations of any two adjacent predetermined color light-emitting diodes are contiguous, or a non-lighting period is between the two lighting durations of the two adjacent predetermined color light-emitting diodes, or some lighting durations of two adjacent predetermined color light-emitting diodes are partially overlap.

The sensor 14 can be a vibration sensor, a spring sensor, or other similar device that generates control signals or sensing signals from detecting external forces. The sensor 14 can also generate different control signals or sensing signals according to the magnitude of the external force. In practical application, the chip can be further designed to pre-store corresponding lighting modes for different ranges of external force values. For example, when the sensor detects a smaller force (such as a light touch by hand), the control chip selects the first lighting mode (as shown in FIG. 7A) to drive multiple predetermined color light-emitting diodes to emit light according to the first sensing signal detected by the sensor. When the sensor detects a stronger impact force or a higher frequency of vibrations, the control chip selects another lighting mode (such as shown in FIG. 7B) according to the second sensing signal detected by the sensor to drive multiple predetermined color light-emitting diodes to emit light. The quantity, arrangement, color of the predetermined color light-emitting diodes, and the lighting modes of the luminous device of the present invention are not limited hereto. Users can design different types of luminous devices and lighting modes according to requirements.

In another embodiment, the luminous device of the present invention further includes a counter which can be arranged on the flexible circuit board or in the control chip. The counter can count the number of control signals (or sensing signals) generated by the sensor 14 and selectively generate a counting signal. The control chip selects alighting mode from several lighting modes stored in the memory according to the control signals or the counting signals and drives the predetermined color light-emitting diodes to emit light according to the lighting mode. The counter has a set number of bits and resets to zero after exceeding this number. For example, if the counter has two bits, it does not generate a counting signal when the counter value is 0 or 1, but generates a counting signal when the counter value is 2 or 3. If the counter has three bits, it does not generate a counting signal when the counter value is 0 to 2, but generates a first preset counting signal when the counter value is 3 to 5 and a second preset counting signal when the counter value is 6 to 7. The same logic applies for counters with other numbers of bits. When the control chip only receives the control signal without receiving a counting signal, the control chip selects the first preset lighting mode to drive the predetermined color light-emitting diodes. When the control chip receives the control signal along with the first preset counting signal, the control chip selects the second preset lighting mode to drive the predetermined color light-emitting diodes. When the control chip receives the control signal along with the second preset counting signal, the control chip selects the third preset lighting mode to drive the predetermined color light-emitting diodes.

In another embodiment, the luminous device of the present invention further includes a signal receiver arranged on the flexible circuit board or within the control chip. Users can use their smart handheld device to connect wirelessly or wiredly to the signal receiver of this embodiment to transmit different lighting modes to the control chip, which are stored in the memory within the control chip.

In another embodiment, the luminous device of the present invention further includes an ON/OFF switch arranged on the flexible circuit board. When the ON/OFF switch is turned off, the battery does not supply power, and thus, regardless of whether the sensor 14 detects an external force, the control chip will not drive the predetermined color light-emitting diodes to emit light. However, when the ON/OFF switch is turned on, the battery supplies power, the control chip will drive the predetermined color light-emitting diodes to emit light when the sensor 14 detecting an external force.

In another embodiment, the luminous device of the present invention further includes a selection switch arranged on the flexible circuit board. By pressing the selection switch each time, different lighting modes can be selected and switched. When the sensor 14 detects an external force, the control chip will select the first flashing mode to drive the predetermined color light-emitting diodes to emit light.

The present invention provides another luminous device comprising a sealed case, the circuit board, the battery, the sensor, the plurality of predetermined color light-emitting diodes, and the control chip. Wherein, the battery, the circuit board, the sensor, and the control chip are arranged inside the sealed case, while the battery, the sensor, and the control chip are arranged on the circuit board. A wire assembly extends from the circuit board through the sealed case and connects to the plurality of predetermined color light-emitting diodes. The sensor detects external force to generate control signal. Each predetermined color light-emitting diode has the same light-emitting diode chip, but different phosphor layers are coated on the surface of the light-emitting diode chips. The phosphors absorb the light emitted by the light-emitting diode chips and convert into other colors of light. Each of the predetermined color light-emitting diodes has the same or substantially the same driving voltage. In practice, the light-emitting diode chip can use a blue light-emitting diode. The control chip is electrically connected to the sensor and the plurality of predetermined color light-emitting diodes, and stores the lighting mode. The control chip receives the control signal from the sensor and select a lighting mode to drive the plurality of predetermined color light-emitting diodes to emit light according to the control signal. In practical applications, the luminous device of this specific embodiment can also store the lighting modes shown in FIG. 7A to FIG. 7G in the control chip, allowing users to store the lighting modes according to their requirements., and can further combine different lighting mode mentioned above.

The present invention provides another luminous device comprising the sensor, the plurality of predetermined color light-emitting diodes, and the control chip. The different between this embodiment and the aforementioned embodiments is that in this embodiment, the control chip further stores a first lighting sequence and a second lighting sequence. The control chip receives control signals detected by the sensor and drives the predetermined color light-emitting diodes to emit light at a fixed frequency according to the first lighting sequence, followed by emitting light at a progressively changing frequency according to the second lighting sequence according to the control signals.

Figure 8:
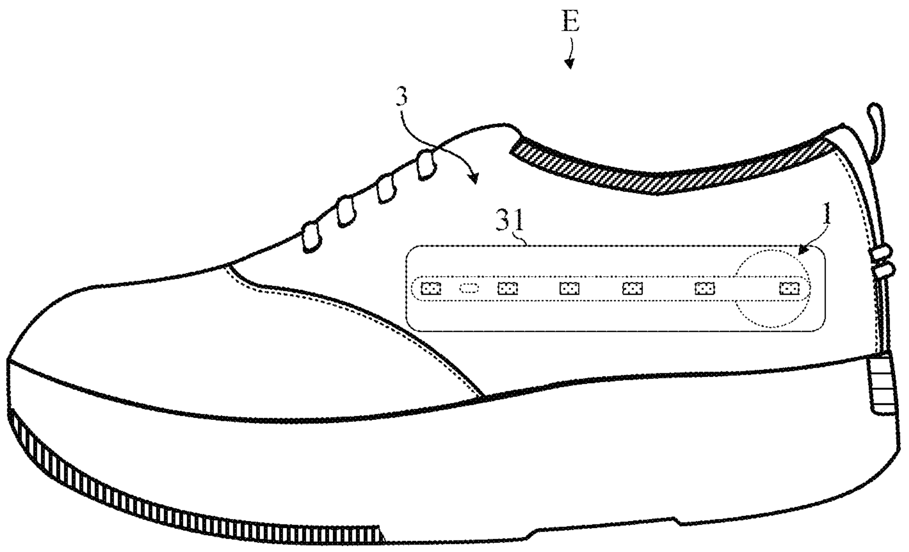
FIG. 8 is a schematic diagram illustrating the wearable object with lighting function in an embodiment of the present invention.

In summary, the luminous device of the invention significantly can reduce the volume of the luminous device without using external wires by integrating all components on a double-sided flexible circuit board. In addition, since the flexible circuit board has good flexibility, heat resistance, and solderability, the components can be further integrated into wearable objects on the market. Please refer to FIG. 8. FIG. 8 is a schematic diagram illustrating the wearable object E with lighting function in an embodiment of the present invention. As shown in FIG. 8, in this embodiment, the wearable object E includes a wearable object body 2 (such as the shoe shown in FIG. 8), a joint 31, and the aforementioned luminous device 1. The luminous device 1 can be fixed to the wearable object body 2 by using the joint 31 (such as tape, adhesive layer, or rivets) or various methods. Furthermore, the luminous device 1 can be covered with a cover (not shown in FIG. 8, such as a translucent plate or an outer layer with a preset pattern).

In practical applications, when the user is walking or running, the sensor 14 will detect the external force generated by the user. Then, the control chip 15 receives the control signal from the sensor, selects a lighting mode, and controls the battery 12 and the predetermined color light-emitting diodes 131~136 to light up according to the lighting mode, which is then displayed through the covering showing the designed lighting color and flashing mode. It should be noted that since the flexible circuit board has the advantages, such as good flexibility and small volume, the flexible circuit board can be arranged in different positions on the shoe (such as the tongue, upper, or side of the sole) by using the joint to achieve different decorative effects. Moreover, the flexible circuit board can even be arranged on wearable object bodies with softer and more deformable surfaces, thereby overcoming the limitation of conventional hard circuit boards that cannot be applied diversely. It should be noted that other devices and functions of the luminous device in this embodiment are the same as the corresponding components in the aforementioned embodiment, so it will not be repeated here. In another embodiment, the luminous device of the wearable object with lighting function includes the aforementioned signal receiver for allowing the user to operate the lighting mode on the shoe's surface through their smart handheld device according to their requirements.

In summary, the present invention provides a luminous device, which can directly be placed on the surface of the flexible circuit board without external wires through the circuit lines in the flexible circuit board for significantly reducing the overall size. Additionally, the luminous device of the present invention can provide multiple lighting modes without increasing complexity of the circuit or adding external wires for the chip to select the corresponding lighting mode according to the control signal detected by the sensor.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A luminous device, comprising:

a flexible circuit board, comprising a first connecting component and a second connecting component;

a battery, arranged on the flexible circuit board, wherein the first connecting component is extended along a side wall of the battery and connected to a first electrode of the battery, and the second connecting component is connected to a second electrode of the battery without bypassing the side wall of the battery;

a plurality of predetermined color light-emitting diodes, arranged on the flexible circuit board and electrically coupled with the battery, the plurality of predetermined color light-emitting diodes comprising a first predetermined color light-emitting diode and a second predetermined color light-emitting diode, the first predetermined color light-emitting diode comprising a first light-emitting diode chip and a first phosphor layer coated on the first light-emitting diode chip, the second predetermined color light-emitting diode comprising a second light-emitting diode chip, wherein each of the predetermined color light-emitting diodes has the same or substantially the same driving voltage;

a sensor, arranged on the flexible circuit board and configured to detect an external force to generate a control signal; and a control chip, arranged on the flexible circuit board and electrically coupled with the sensor, the plurality of predetermined color light-emitting diodes and the battery, the control chip being configured to receive the control signal from the sensor and select a lighting mode according to the control signal to control the plurality of predetermined color light-emitting diodes to emit light.

2. The luminous device of claim 1, wherein a lighting color of the first predetermined color light-emitting diode is different from a lighting color of the second predetermined color light-emitting diode, wherein the lighting color of the first predetermined color light-emitting diode is red-tinted, green-tinted, yellow-tinted, orange-tinted, cyan green-tinted, lime green-tinted, purple-tinted, pink-tinted, ice blue-tinted, or white-tinted; wherein the first light-emitting diode chip and the second light-emitting diode chip are blue light-emitting diode chips, and the second predetermined color light-emitting diode is not coated with a phosphor layer.

3. The luminous device of claim 2, wherein the plurality of predetermined color light-emitting diodes further comprise a third predetermined color light-emitting diode, the third predetermined color light-emitting diode comprises a third light-emitting diode chip and a third phosphor layer coated on the third light-emitting diode chip, wherein a lighting color of the third predetermined color light-emitting diode is different from the light color of the second predetermined color light-emitting diode.

4. The luminous device of claim 2, wherein the lighting color of the first predetermined color light-emitting diode is orange-tinted, cyan green-tinted, lime green-tinted, purple-tinted, pink-tinted, ice blue-tinted, or white-tinted, the second predetermined color light-emitting diode further comprises a second phosphor layer coated on the second light-emitting diode chip, and the lighting color of the second predetermined color light-emitting diode is orange-tinted, cyan green-tinted, lime green-tinted, purple-tinted, pink-tinted, ice blue-tinted, or white-tinted; wherein both the first light-emitting diode chip and the second light-emitting diode chip are blue light-emitting diode chips.

5. The luminous device of claim 2, wherein the plurality of predetermined color light-emitting diodes are arranged on a first side of the flexible circuit board, and the battery is arranged on a second side of the flexible circuit board corresponding to the first side, wherein one end of the first connecting component is soldered to the first side of the flexible circuit board, and one end of the second connecting component is soldered to the first side of the flexible circuit board and the second connecting component passes through the flexible circuit board.

6. The luminous device of claim 1, wherein the flexible circuit board has a cavity, and the sensor is arranged within the cavity, wherein a width of the cavity is smaller than a width of the sensor.

7. The luminous device of claim 1, wherein a case of the sensor is electrically connected to a first side of the flexible circuit board, and an electrode of the sensor is electrically connected to the first side or a second side of the flexible circuit board.

8. The luminous device of claim 1, wherein a maximum width of the flexible circuit board is the same as or greater than a diameter of the battery.

9. The luminous device of claim 1, wherein the lighting mode comprises a sequential flashing mode, a synchronous flashing mode, a reciprocating flashing mode, an alternating flashing mode, a marquee flashing mode, a gradual brightening and dimming mode, and a gradual dimming and brightening mode.

10. The luminous device of claim 1, the lighting mode comprises a first lighting sequence and a second lighting sequence following the first lighting sequence, the plurality of predetermined color light-emitting diodes emit light at a first flashing frequency in the first lighting sequence, the plurality of predetermined color light-emitting diodes emit light at a second frequency in the second lighting sequence, wherein the second flashing frequency is different from the first flashing frequency.

11. The luminous device of claim 10, wherein both the first light-emitting diode chip and the second light-emitting diode chip are blue light-emitting diode chips, and the second predetermined color light-emitting diode is not coated with a phosphor layer.

12. The luminous device of claim 11, wherein the plurality of predetermined color light-emitting diodes further comprise a third predetermined color light-emitting diode, the third predetermined color light-emitting diode comprises a third light-emitting diode chip and a third phosphor layer coated on the third light-emitting diode chip, wherein a lighting color of the third predetermined color light-emitting diode is different from a lighting color of the second predetermined color light-emitting diode, and the third light-emitting diode chip is a blue light-emitting diode chip.

13. The luminous device of claim 10, wherein the plurality of predetermined color light-emitting diodes emit light sequentially at the first flashing frequency in the first lighting sequence; the plurality of predetermined color light-emitting diodes emit light sequentially at the second frequency in the second lighting sequence, wherein the second flashing frequency is a gradually-changing frequency.

14. The luminous device of claim 13, wherein a lighting duration for each predetermined color light-emitting diode is the same in the first lighting sequence, wherein two lighting durations of two adjacent predetermined color light-emitting diodes are contiguous, or a non-lighting period is between the two lighting durations of the two adjacent predetermined color light-emitting diodes.

15. The luminous device of claim 10, wherein the plurality of predetermined color light-emitting diodes emit light sequentially by N times at the first flashing frequency in the first lighting sequence, and the plurality of predetermined color light-emitting diodes emit light simultaneously at the second flashing frequency in the second lighting sequence.

16. The luminous device of claim 1, further comprising:

a counter, configured to count a number of the control signal generated from the sensor for selectively generating a counting signal; and wherein, the control chip comprises a memory device stored with a plurality of lighting modes, and the control chip selects a lighting mode from the plurality of lighting modes to drive the plurality of predetermined color light-emitting diodes to emit light according to the control signal and the counting signal.

17. The luminous device of claim 16, wherein both the first light-emitting diode chip and the second light-emitting diode chip are blue light-emitting diode chips, and the second predetermined color light-emitting diode is not coated with a phosphor layer.

18. The luminous device of claim 17, wherein the plurality of predetermined color light-emitting diodes further comprises a third predetermined color light-emitting diode, the third predetermined color light-emitting diode comprises a third light-emitting diode chip and a third phosphor layer coated on the third light-emitting diode chip, wherein a light color of the third predetermined color light-emitting diode is different from a light color of the second predetermined color light-emitting diode, and the third light-emitting diode chip is a blue light-emitting diode chip.

19. The luminous device of claim 16, wherein the lighting modes comprise a sequential flashing mode, a synchronous flashing mode, a reciprocating flashing mode, an alternating flashing mode, a marquee flashing mode, a gradual brightening and dimming mode, and a gradual dimming and brightening mode.

20. The luminous device of claim 1, wherein the plurality of predetermined color light-emitting diodes further comprises a third predetermined color light-emitting diode, the third predetermined color light-emitting diode comprises a third light-emitting diode chip and a third phosphor layer coated on the third light-emitting diode chip;

wherein, the lighting mode comprises a first lighting sequence and a second lighting sequence following the first lighting sequence, the plurality of predetermined color light-emitting diodes sequentially emit light at least once in the first lighting sequence, and the plurality of predetermined color light-emitting diodes simultaneously emits light at least once in the second lighting sequence.

21. The luminous device of claim 20, wherein the second predetermined color light-emitting diode is not coated with a phosphor layer; the first light-emitting diode chip, the second light-emitting diode chip, and the third light-emitting diode chip are blue light-emitting diode chips, wherein a lighting color of the first predetermined color light-emitting diode and a lighting color of the third predetermined color light-emitting diode are different from a lighting color of the second predetermined color light-emitting diode.

22. A wearable object with a lighting function, comprising:

a wearable object body; and a luminous device arranged on the wearable object body, the luminous device comprising:

a flexible circuit board, comprising a first connecting component and a second connecting component;

a battery, arranged on the flexible circuit board, wherein the first connecting component is extended along a side wall of the battery and connected to a first electrode of the battery, and the second connecting component is connected to a second electrode of the battery without bypassing the side wall of the battery;

a plurality of predetermined color light-emitting diodes, arranged on the flexible circuit board and electrically coupled with the battery, the plurality of predetermined color light-emitting diodes comprising a first predetermined color light-emitting diode and a second predetermined color light-emitting diode, the first predetermined color light-emitting diode comprising a first light-emitting diode chip and a first phosphor layer coated on the first light-emitting diode chip, the second predetermined color light-emitting diode comprising a second light-emitting diode chip, wherein each of the predetermined color light-emitting diodes has the same or substantially the same driving voltage;

a sensor, arranged on the flexible circuit board and configured to detect an external force to generate a control signal; and a control chip, arranged on the flexible circuit board and electrically coupled with the sensor, the plurality of predetermined color light-emitting diodes and the battery, the control chip being configured to receive the control signal from the sensor and select a lighting mode according to the control signal to control the plurality of predetermined color light-emitting diodes to emit light.

* * * * *